Figure 1:
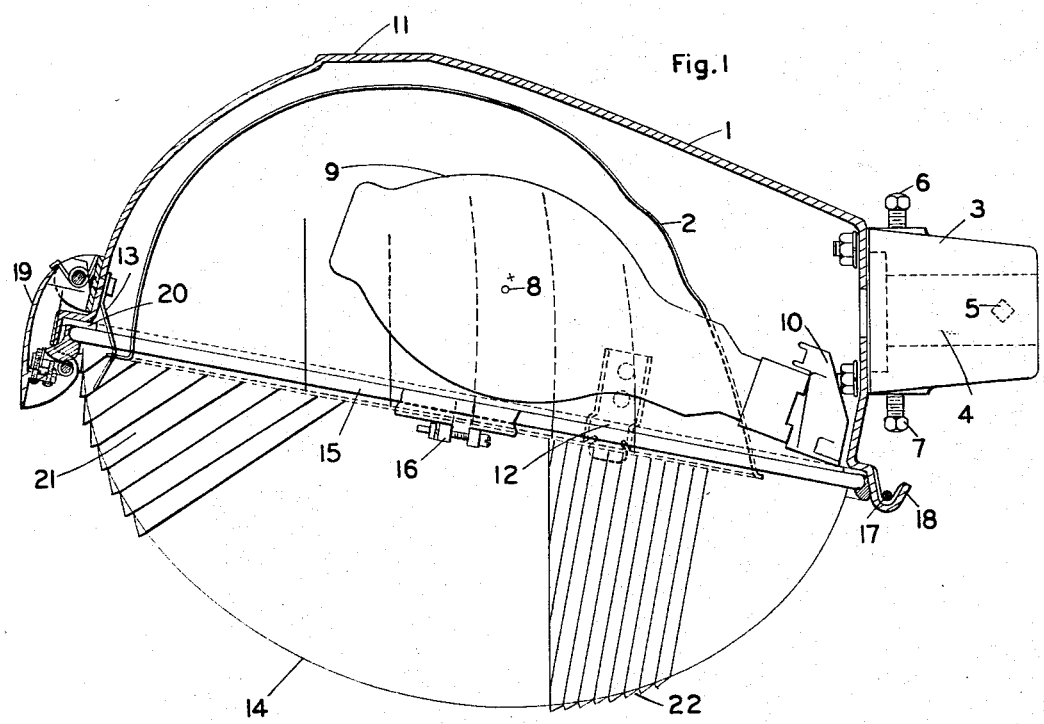

Nov. 1, 1966 C. H. REX 3,283,140
STREET LUMINAIRE

Filed Oct. 24, 1955 7 Sheets-Sheet 1

Inventor:
Charles H. Rex
by *Richard E. Hosley*
His Attorney

Nov. 1, 1966 — C. H. REX — 3,283,140
STREET LUMINAIRE
Filed Oct. 24, 1955 — 7 Sheets-Sheet 2

Inventor
Charles H. Rex
by Richard E. Hosley
His Attorney

Nov. 1, 1966 — C. H. REX — 3,283,140
STREET LUMINAIRE
Filed Oct. 24, 1955 — 7 Sheets-Sheet 3

Inventor:
Charles H. Rex
by, Richard E. Hosley
His Attorney

Inventor:
Charles H. Rex
by, Richard E. Horley
His Attorney

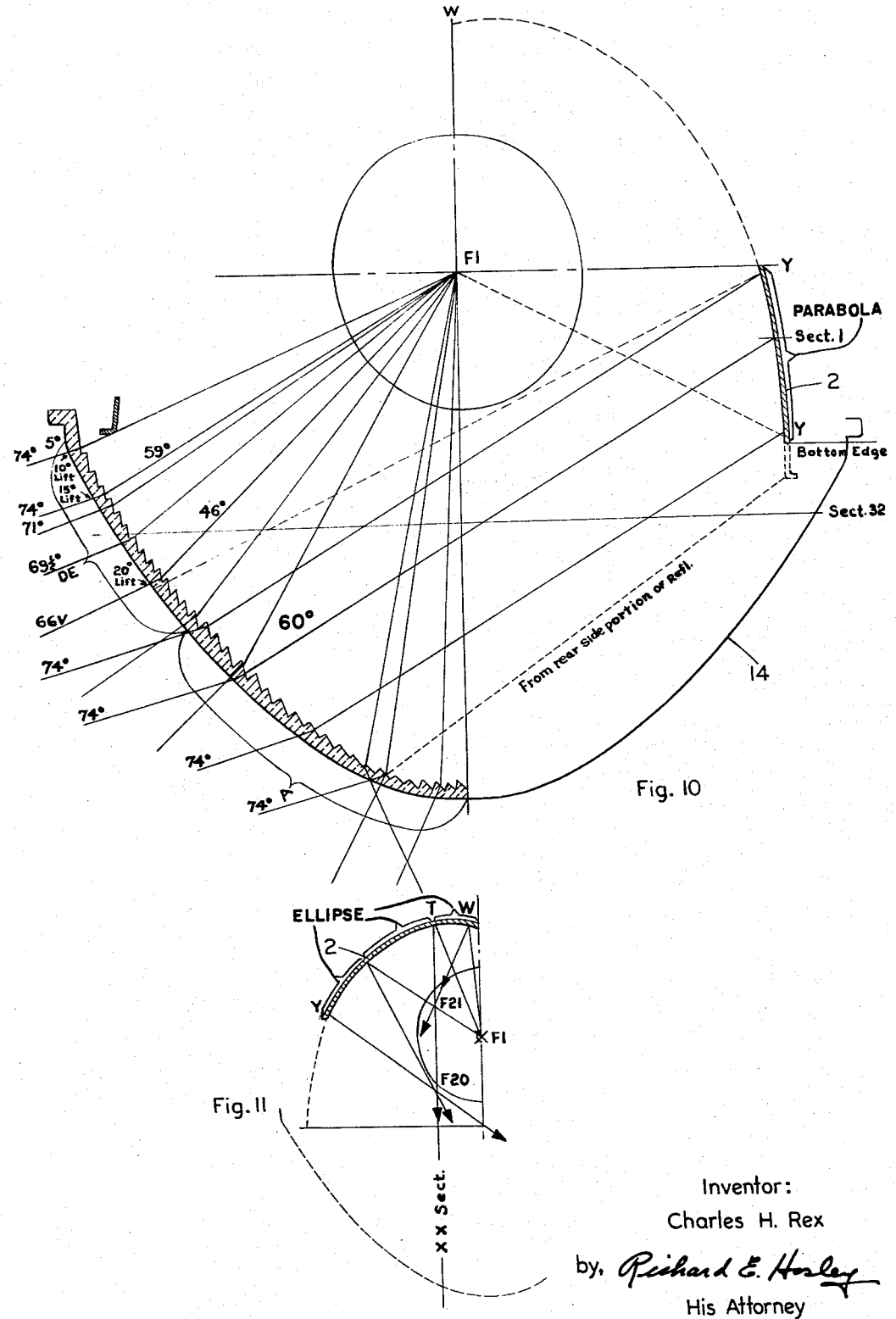

Inventor:
Charles H. Rex
by, Richard E. Horley
His Attorney

United States Patent Office 3,283,140
Patented Nov. 1, 1966

3,283,140
STREET LUMINAIRE
Charles H. Rex, Marblehead, Mass., assignor to General Electric Company, a corporation of New York
Filed Oct. 24, 1955, Ser. No. 542,267
13 Claims. (Cl. 240—25)

My invention relates to luminaires, and more particularly to street or roadway luminaires of the enclosed type including an upper bowl-shaped reflector and a lower bowl-shaped refractor closing the mouth of the reflector.

It has heretofore been proposed to use a luminaire having an ovate horizontal configuration. By disposing such an ovate luminaire at one side of the road with its larger end facing the road, the lower side portions of the reflector may be arranged to direct a large portion of the available light flux into a pair of main oblique reflected light beams directed toward locations in opposite directions along said roadway. By combining a refractor with such a reflector, it is possible to raise the main beams of reflected light from a light source located a substantial distance within the reflector and at the same time direct into or toward the main beams a large proportion of the remaining available direct and reflected light. By establishing the main beams at a low vertical angle and raising them by refraction, a wide vertical solid angle of light flux may be directed into the main beams and the cross-sectional area of a main beam as it leaves the refractor may be increased for advantages such as larger brightness areas.

In such arrangements, the light may be obtained from a concentrated filament source such as provided by an incandescent lamp or from an elongated light source such as provided by the arc of a mercury arc lamp. In each case, the optical system may be designed with regard to the geometric center of such a light source, and where an elongated light source is employed, this has been positioned horizontally to the roadway surface. The candle power and lumen output from a mercury lamp arc is highest at angles perpendicular to the lamp axis with comparatively little light being obtained from the ends thereof. With a horizontal location of such a mercury lamp in the luminaire, double reflection may be required from the reflector thereof. This is because a large proportion of the light from a horizontal elongated light source is necessarily incident on the street-side or front surfaces of the reflector. Consequently, the light reflected from the street-side surfaces of the reflector cannot be directed toward the far side of the roadway pattern without being reflected again from a reflector section located at the house-side or rear of the reflector. Furthermore the prismatic areas of the refractor have been comprised so as to handle both the reflecting light and light obtained directly from the light source. This complicates the design of the luminaire and does not make the most effective and efficient use of the light from the light source.

In many luminaires heretofore proposed, the arrangement of parts is not conducive to ease in installation or servicing of the luminaire. Furthermore, any particular luminaire may be lacking in flexibility in that it may not be suitable for controlling the lateral light distribution to a roadway in accordance with the varying widths of the roadways to be lighted.

Accordingly, therefore, it is a general object of my invention to provide a new and improved street or roadway luminaire for side-of-the-roadway mounting having improved optical performance resulting from better light control of an elongated light source which places more light within the pattern of the roadway.

It is also an object of my invention to provide a luminaire having its elongated light source tilted up toward the roadway at an acute angle to make better use of the candle power and lumen output of mercury arc lamp which is highest at angles perpendicular to the lamp axis and having the lower edge of its reflector terminating in a plane which is inclined up toward the roadway for improved use of the rear portions of the reflector for direction of light to the roadway whereby better use is obtained from the shielding opaque cut-off of the reflector edge and advantageous use is made of the shielding action obtainable from light depressing prisms.

It is another object of my invention to provide a luminaire in which different reflectors may be readily substituted one for the other in combination with the same refractor to provide a wide variety of street lighting applications having different lateral widths of distribution extending at different transverse distances across the roadway.

Additional objects of my invention will become apparent from the following description of embodiments thereof.

Figure 3:
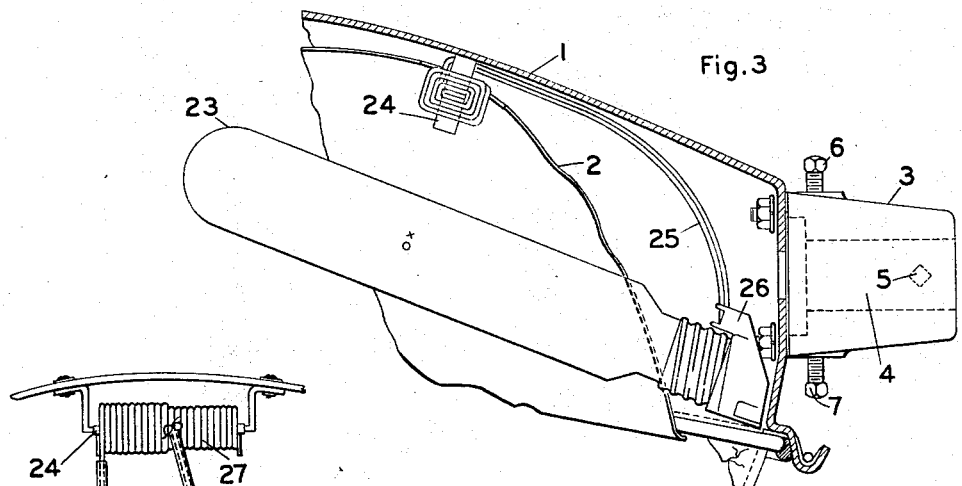
Figure 4:
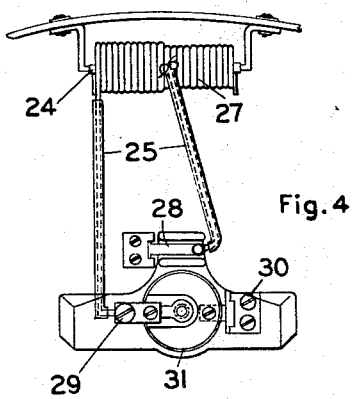
Figure 2:
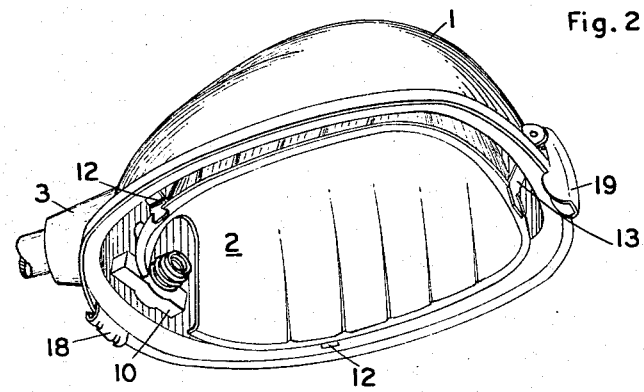
Figure 5:
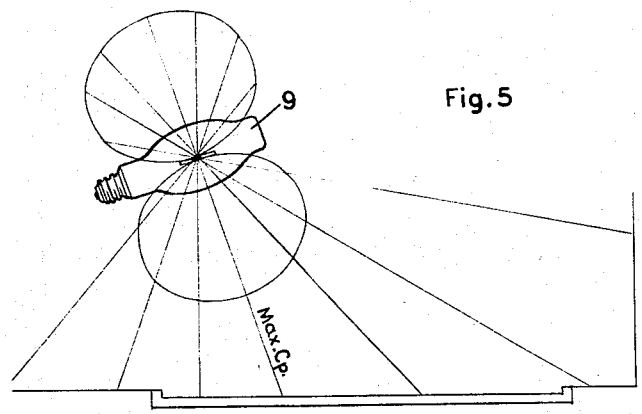
Figure 13:
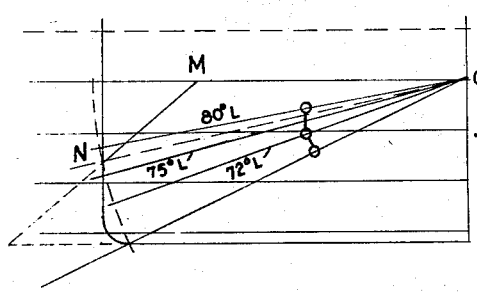
Figure 14:
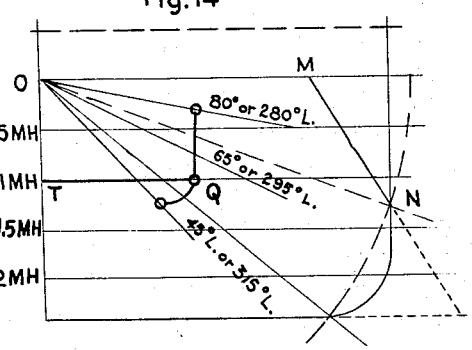
Figure 6:
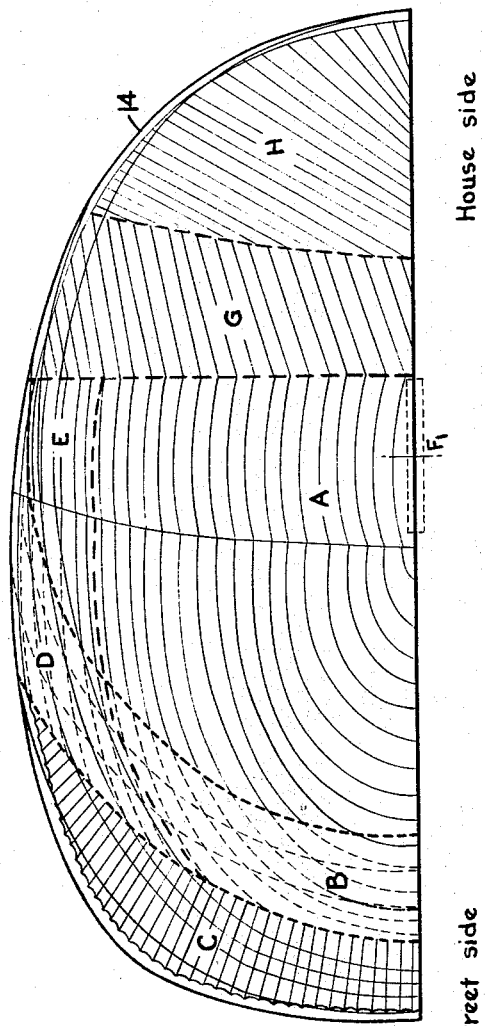
Figure 7:
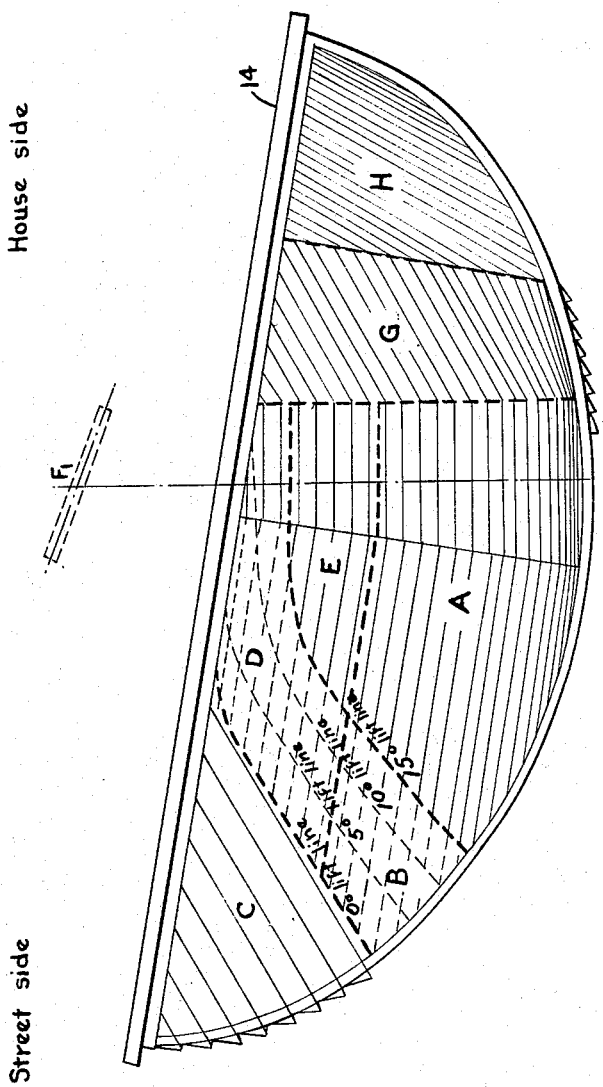
Figure 12:
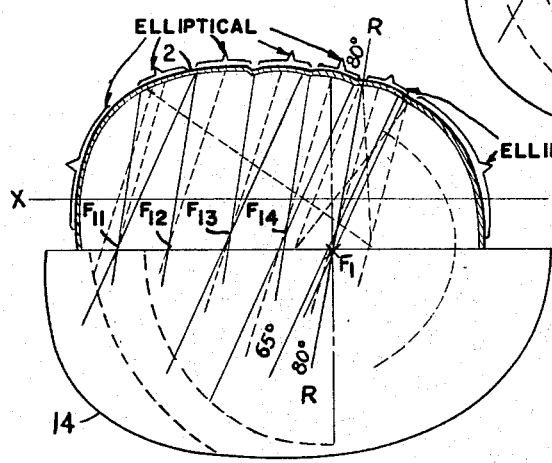
Figure 15:
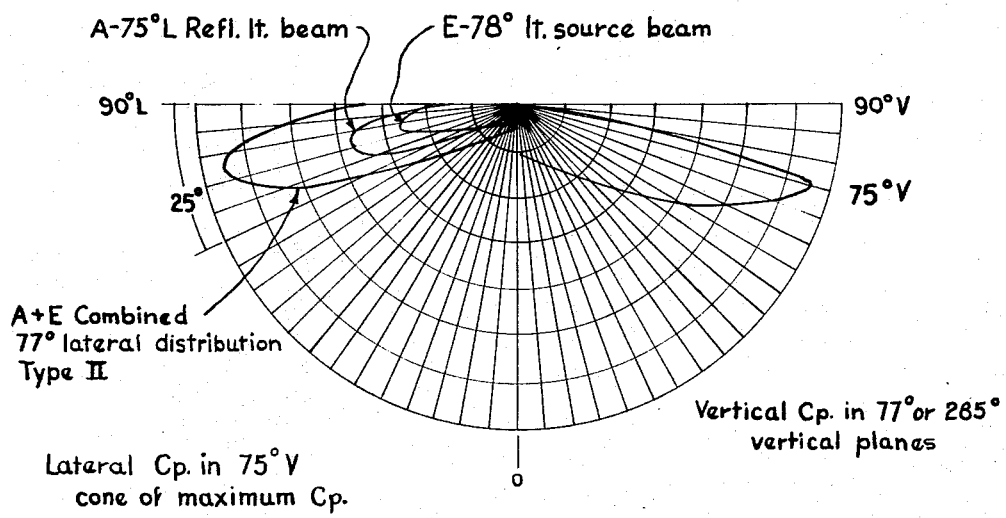
Figure 16:
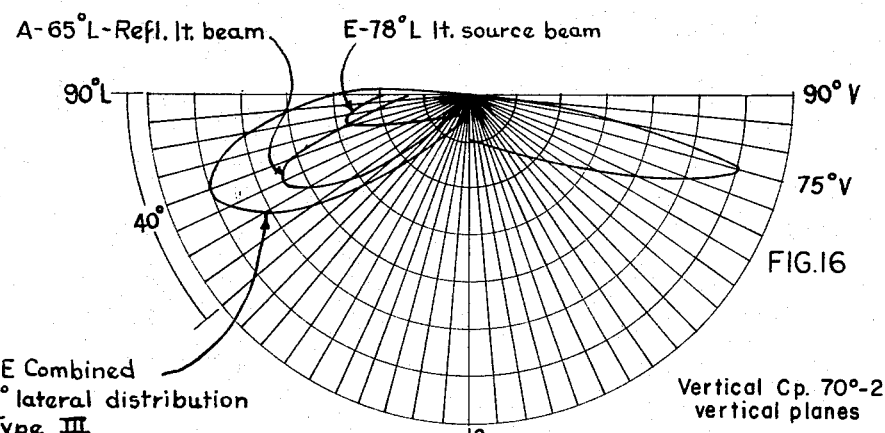
Figure 19:
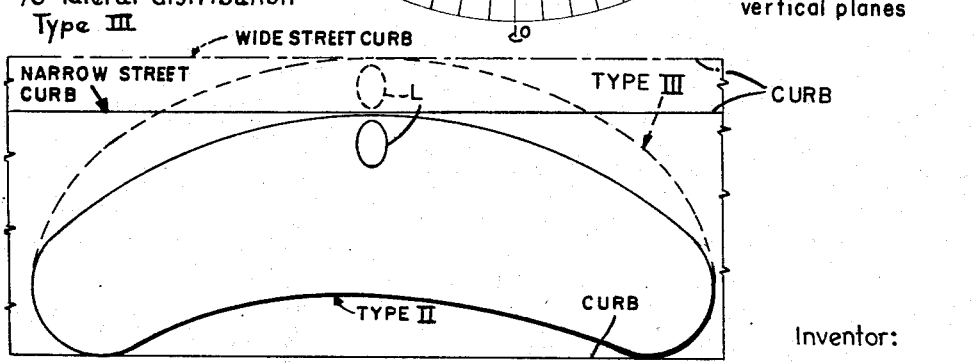
Figure 17:
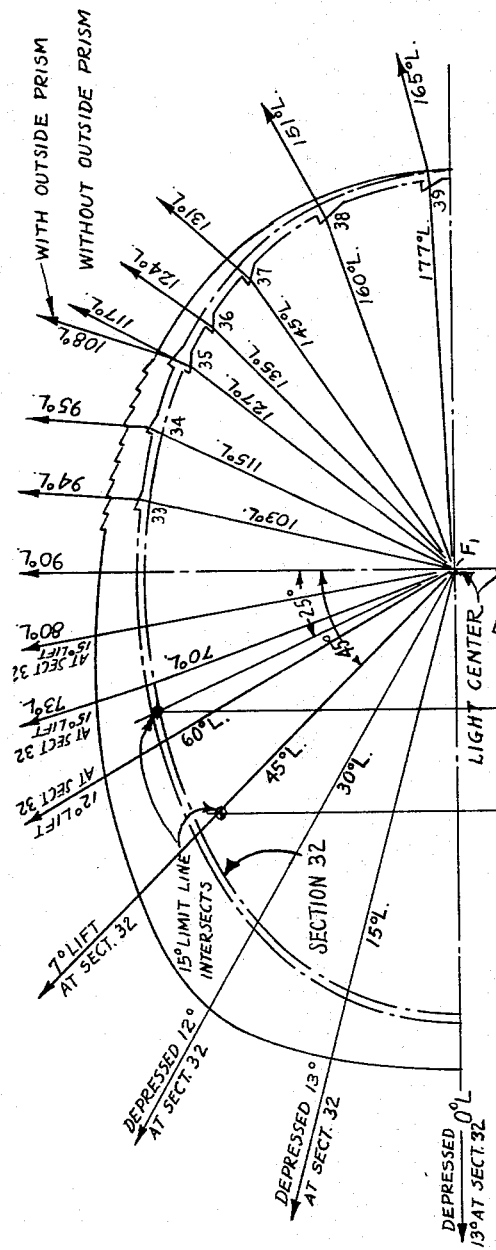
Figure 18:
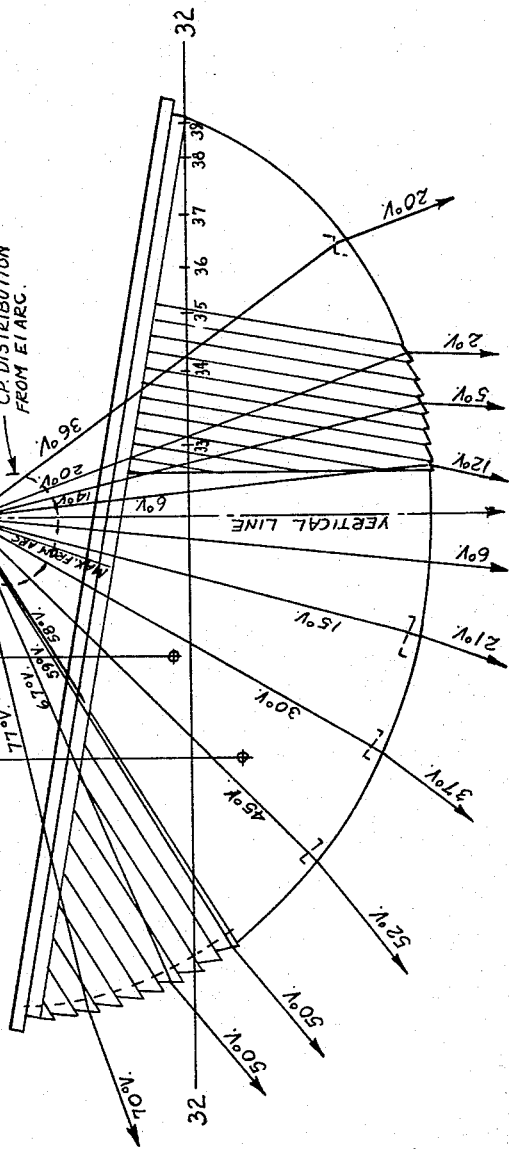

For a better understanding of my invention and a further appreciation of its various objects and advantages, reference may be had to the following detailed specification taken in connection with the accompanying drawings in which FIG. 1 is a side view of my luminaire with the casing and reflector thereof shown in section; FIG. 2 is a perspective view of the casing-reflector assembly as viewed from below with the refractor removed; FIG. 3 is a partial view, principally in section, of a luminaire having an electromagnet for controlling the long arcs of certain mercury arc lamp; FIG. 4 is a fragmentary view showing how the electromagnet of FIG. 3 is permanently wired into a combination terminal block and lamp socket provided with three terminals; FIG. 5 is a view showing the unmodified candlepower light distribution curve with respect to the roadway from a tilted mercury arc lamp such as shown in FIG. 1; FIGS. 6 and 7 are respectively plan and side views of the refractor of the luminaire indicating the prisms thereof and the separate functional areas into which these prisms are divided for light control purposes; FIGS. 8, 9, 10, and 11 are light diagrams showing the manner in which the light from the source is controlled by the reflector in order to obtain a Type III A.S.A. light distribution; FIG. 12 is a light diagram showing the reflector contour for Type II A.S.A. light distribution when using a substitute reflector for the one shown in FIG. 9; FIGS. 13 and 14 are roadway pattern diagrams scaled transversely of the roadway plan in multiples of the mounting height (M-H) of the luminaire for Type II and Type III light distributions respectively; FIGS. 15 and 16 are respectively candlepower and light distributing curves for Type II and Type III light distributions and show the manner in which a constant direct light source beam is combined with reflected light beams of different lateral angularly for obtaining the Type II and III distributions required; FIGS. 17 and 18 are light diagrams explaining the prismatic redirection of light received directly from the light source; and FIG. 19 is a diagrammatic view of roadway light patterns for Type II and Type III light distribution.

The mechanical construction of my luminaire includes an ovate bowl-shaped casing enclosing a snap-in reflector and a bowl-shaped refractor which closes the mouth of the casing.

As previously noted, the candle power and lumen output from a mercury arc lamp arc is highest at angles perpendicular to the lamp axis with comparatively little near the ends of its axis. If the lamp axis is positoned horizontally and transversely to the roadway, an approximately equal amount of light would be delivered to the house side and street side of the roadway. But less light is wanted on the house side and more lamp light is needed on the street side toward the pavement center line. To obtain this desirable asymmetry and more efficient street side use of downward direct light from the lamp, the axis of the light source in luminaires constructed in accordance with these teachings is tilted up toward the roadway by about 10° to 20° in a plane transverse to the roadway and the rim of the reflector associated therewith is also cut off in a plane tilted up by about 10°. The upwardly directed light from this up tilted light source is controlled by a reflector which directs reflected light through a refractor toward the roadway.

The reflector is contoured along its sides to provide main beams of reflected light which are directed downward through the mouth of the reflector and below the light source at lateral angles predominantly along and across the roadway pattern to prismatic reflected light beam areas on the opposite sides of the refractor which lift the light beams by about 15° when the beam portion of reflected light has an angle of about 60°. The lateral angle of this reflected light may be varied by using different reflectors which, for example, produce light beams at 75° lateral for Type II light distribution and at 65° lateral for Type III light distribution. The lateral angles of these reflected light beams, as determined by the reflector used, supplement the light source beams redirected from the light source by the remaining areas of the refractor to determine the width and direction of light distribution to the roadway. The reflected light beam elevating prisms of the refractor are designed for acting on the reflected light and the remaining prismatic areas of the refractor, which receive little or no reflected light, are designed for light directly incident thereto from the light source.

As previously noted, the mouth of the reflector is inclined to the roadway in the same direction as the elongated light source. This results in a lower angle of shielding on the house-side of the luminaire to vertical angles such as 70° without lowering the 75° vertical angle of maximum candle power supplied by the reflected light beams. Inclination of the elongated light source and of the reflector and refractor also facilitates control of the light distribution for reduction of the adverse effects of disability or veiling glare.

In a transverse across-the-road vertical section through the luminaire, hereafter known as the vertical median plane, most of the light from the inclined elongated light source is transmitted through the refractor without vertical prismatic action. There are, however, prisms on the upper front portion of the refractor which depress direct light incident thereto downwardly to the roadway. These prisms occupy a visor-shaped area wrapped around the entire upper front portion of the refractor for shielding and build up of light along the far side of the roadway pattern. On the house side of the refractor immediately behind the areas thereof which intercept the main beams of reflected light, a band of wrap-around prisms may also be provided for deflecting light incident thereto to the roadway. In this same median plane, control of upward light from the light source is obtained by deflection across the roadway largely without the aid of prismatic control. The reflector contour proportions of the light distribution toward the center and far side of the roadway. Elliptical transverse top sections of the reflector distribute light along longitudinal roadway lines between locations where the maximum candlepower of the reflected light beams impinge on the roadway. The desired pavement brightness along the far side of the roadway is obtained in part by the three dimensional twist contouring in this upper portion of the reflector in combination with prismatic control by the refractor.

Referring to the drawing, and in particular to FIGS. 1 and 2 thereof, my luminaire comprises an ovate bowl-shaped casing 1 housing a detachable ovate bowl-shaped reflector 2 and supported by a bracket 3 at its rear or house side end. This bracket 3, commonly referred to as a slipfitter, is provided with a pipe socket 4 for mounting on the end of a support pipe, a portion of which is shown in FIG. 2, to which it is attached by a locking screw 5 which is threaded in and passes through the side wall of the slipfitter. Top and bottom leveling screws 6 and 7, which also pass through the side wall of the slipfitter, are provided for leveling the luminaire on its support member. The longitudinal support axis of the pipe socket 4 of slipfitter 3 is inclined at an angle of about 10° with the rim portion of casing 1 located about the open mouth thereof and a projection of this support axis passes through the elongated light source 8 of a mercury arc lamp 9 which is mounted in a lamp socket 10 attached to the lower bottom rear portion of casing 1. This lamp socket 10 is positioned in the casing 1 so that the longitudinal axis of the elongated light source 8 is tilted up toward the roadway at an angle of about 20°. In order that the angles of tilt above-described may be obtained, the casing 1 is provided with a leveling pad 11 at its top which has a surface parallel to the support axis of the slipfitter 3. By placing a spirit level on the top surface of the leveling pad 11 and adjusting leveling screws 6 and 7, the desired angularity of the rim portion of the casing and of the longitudinal axis of the lamp may be obtained with accuracy.

The reflector 2 is provided with a rim portion which fits within the rim portion of casing 1. It is held in place in the casing by oppositely disposed support brackets 12 which are attached to the inside surface of casing 1 near the open mouth thereof. These support brackets are notched at their projecting edge portions to engage projecting portions of the flanged rim of reflector 2. These notches are at an angle in order to secure a snubbing engagement with the flanged portions of the reflector located therein when the reflector is held in its adjusted position by a spring clip 13 which engages the front edge portion of the rim of reflector 2 and is mounted on the lower inside surface of the front portion of casing 1. The reflector 2 has a cutaway portion at its rear end to provide a passageway for the lamp 9 which projects into its cavity and for affording access to the terminals of the socket 10 for the lamp without removing the reflector from its position in the casing. The construction of the reflector and its mounting in casing 1 is such that it may be removed from the casing by releasing spring clip 13 and rotating it to clear lamp 9 without removing the lamp from its socket. Wiring access holes extending through the slipfitter at the bottom of its socket 4 and through the casing 1 in register with the pipe socket of slipfitter 3, are provided for the lead-in wires which are connected to the terminals of lamp socket 10 for supplying electric current to lamp 9. Glass wool or other suitable packing may be employed at the bottom of the pipe socket in the slipfitter for preventing the entrance of foreign substances into the luminaire through these holes provided for the supply wires.

The reflector 2 may be made of aluminum or an alloy thereof and its inside reflecting surface is provided with a high specular finish. Its configuration will be described below in connection with FIGS. 8 to 12 inclusive.

The open mouth of the casing 1 is closed by an ovate bowl-shaped glass refractor 14 which is mounted in a holder 15 which engages the rim portion of the refractor. This holder is of split ring construction and is provided with a clamping screw arrangement 16 to accommodate variations in rim sizes of different refractors. The holder is hinged at its house side by means of a steel pin 17 which forms a part thereof and rests in a hooked portion 18 of the casing 1 to provide a pickoff hinge connection between the casing 1 and the holder 15. The front end of the holder 15 is provided with a projection which is engaged by a roller latch 19 on the front outside edge portion of casing 1 when the refractor is in its closed position. The holder 15 is so constructed that the rim edge of refractor 14 rests directly against a gasket 20 which is cemented to or otherwise attached to the rim portion about the open mouth of the casing 1. Latch 19 may be made adjustable so as to obtain a tight seal between the rim of refractor 14 and gasket 20 mounted on the rim portion of casing 1.

As shown in FIG. 1, the refractor 14 is provided on its external surface with bands of wrap around prisms which are employed for light control. These prisms occupy a visor-shaped area 21 at the front end of the refractor and a band area 22 a slight distance behind the light center of the arc 8 of lamp 9. As will be seen below in connection with FIG. 8, practically no reflected light is directed through the visor-shaped area 21 of light depressing prisms, and this area acts almost exclusively on light radiating directly from the light source. The importance of this visor-shaped area will be discussed more fully in connection with FIGS. 17 and 18, which show the prismatic action on the light emanating directly from the source. The other external surfaces of the refractor, shown in FIG. 1 as being smooth may be provided with small ripples which are generally vertical in direction and have no definite pattern anywhere on the refractor surface. The internal surface of the refractor, except at the very front portion thereof, is provided with prisms, the nature and extent of which will be described in detail below principally in connection with the disclosure in FIGS. 6 and 7 of the drawing. The very front internal surface of the refractor may be provided with a plurality of vertical flutes which are employed for light diffusion purposes as are the ripple areas on the external surface of the refractor referred to above.

As shown in FIG. 3, the length of some lamps 23 used in my luminaire may require magnetic control in order to prevent excessive bowing of the long arcs thereof which may be six inches in length or longer. As shown in FIG. 3, the desired magnetic control is maintained by mounting an electromagnet 24 on the top inside surface of casing 1 in the desired location above the lamp. A suitable opening may be cut through the top wall portion of reflector 2 in order to accommodate this electromagnet as shown in FIG. 3. In order to provide a convenient wiring in of the lead conductors 25 of the electromagnet, a combined terminal block and lamp socket 26 may be provided. The arrangement is diagrammatically illustrated in FIG. 4 in which the leads 25 to the field winding 27 of the electromagnet 24 are connected to terminals 28 and 29 of a combined lamp socket and terminal block. The lead in wires to the luminaire may then be connected to terminals 28 and 30 of the terminal block portion of the lamp socket thereby connecting the lamp circuit and the electromagnet field winding circuit in series with one another since terminals 29 and 30 are respectively connected to the terminals of the lamp when the lamp is in the socket portion 31 of the combined terminal block and lamp socket illustrated.

The glass refractor of my luminaire is shown in detail in FIGS. 6 and 7. It is symmetrical on opposite sides of the vertical median plane. In addition to the external prism areas previously described in connection with the description of FIGS. 1 and 2, the interior surface of the refractor is provided with several areas of prisms for controlling light incident thereto and transmitted through the walls of the refractor. The refractor curvatures are such as to facilitate its easy removal from the mold in which it is formed. Consequently, a large amount of its surface is formed of spherical or near spherical areas. Overall, however, the refractor is ovate along horizontal sections and its large end faces the roadway.

One of the features of my invention is the sectionalizing of the refractor prisms into functional areas coordinated with the reflector contouring so that the reflected light is largely confined to areas A and to some extent to areas B shown in FIGS. 6 and 7 of the drawings. The prisms in the A areas, which may be designated as the reflected light beam sections, provide a vertical concentration of the incident light from the reflector. The light therefrom supplements that from areas D, E, G and H, which may be designated as the light source beam sections, to provide well formed beams of maximum candle power. With proper concentration and uniform upward lift from the prisms in the A area, the lateral width of light distribution in the cone of maximum candle power is varied from Type II to Type III A.S.A. American Standard Practice for Street and Highway Lighting, by change of the incident light from the reflector. That portion of the light source beam from areas B, C and the front portion of areas D and E shown in FIGS. 6 and 7 of the drawings properly supplement the light distribution along the far side of the roadway.

Areas A in the lower, predominantly-street-side portion of the refractor includes prisms which lift and vertically redirect the incident reflected light beam. The major portion of the prisms in this area uniformly lift the reflected light by about 15°. The principal concentration of reflected light varies through vertical angles of 59°, 60°, and 61°, depending upon the vertical angle required, at various lateral angles, for light concentration along the generally longitudinal roadway pattern. Although areas A are provided primarily for the redirection of the reflected light beam, it is apparent that the incident light from the source $F_1$ is correspondingly redirected as may be seen from the vertical section diagram FIG. 10. It is to be noted that the prismatic configuration in the reflected light beam areas A described is such as to redirect the incident reflected light beam vertically without substantially altering its lateral angles of direction. It will be seen later, principally in connection with FIGS. 9, 12, 15 and 16, that the forward lateral angles to which the reflected light beams are directed are dependent principally upon the particular reflector employed. The subdivision of the refractor into light source beam areas and reflected light beam areas as described permits the substitution of different reflectors which vary the lateral angles of the reflected light beams. By selecting the proper reflector, the light source beams may be supplemented to provide a combined beam of maximum candle power with different desired candle power distributions, such as the ASA Types II and III shown in FIGS. 15 and 16.

Figure 9:
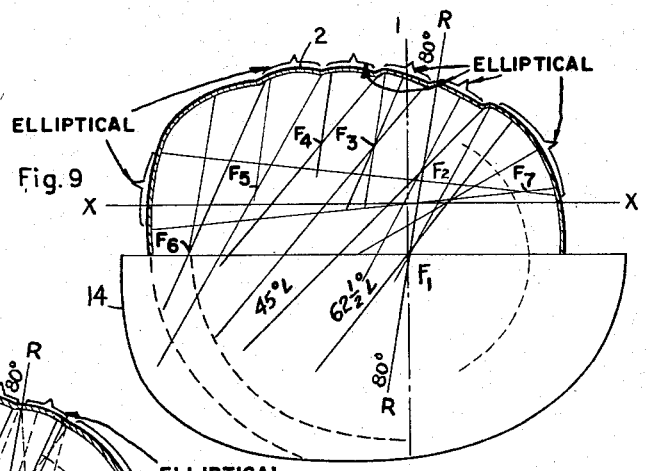

Along the bottom keel portion of these A refractor areas the prismatic lifting action is somewhat modified for increased efficiency in redirecting the low-angle light from the source $F_1$ and from the upper regions of the reflector such as those adjacent to section XX shown in FIGS. 9 and 12. The predominant prismatic redirection is along the roadway longitudinally with less lift in directions transverse the roadway. This is in accordance with the longitudinal outline of the road pattern.

The prisms in areas B are similar to those in areas A except that the lifting redirection of incident light (reflected and from the source), is tapered down from 15° to 0° at the locations indicated by the 15°, 10°, 5° and 0° lift lines. For example, the 15° lift line represents the demarcation between sections A and sections B and designates the uppermost positions on the refractor at which prisms may provide 15° lifting redirection without lifting the light from the source $F_1$ beyond the street side line on the roadway pattern FIGS. 13 and 14.

In areas C the visor-shaped area of light depressing prisms above the 0° lift line serves a similar purpose. Here depressing prisms lower the incident light to fall within the roadway pattern to the extent practicable.

In the D, E, G, and H areas of the refractor, the prisms are primarily designed for direct light from the source $F_1$. In areas D the lifting of direct light is purposefully limited to keep the light from the source $F_1$ largely within the roadway pattern. In areas E the lifting action may exceed 15°, since those portions of the light source beam which are incident on areas E strike the refractor at lower vertical angles than those portions incident on areas D. Consequently, a greater lift may be given to the light incident on areas E without directing it beyond the roadway pattern. FIG. 10 illustrates that the lifting action of the prisms in these light source beam sections increases with depth of the reflector from as little as 5° or 10° in the uppermost portions to above 20° in the lower regions of the direct light beam section. A limiting factor on the amount of lift obtainable in the lower regions of the light source beam sections is the greatest angle of prism faces which will permit the refractor to be withdrawn from its mold.

The nearly vertical demarcation line between areas G and the adjacent areas A represents the boundary between the reflected light beam sections and the areas at the rear of the refractor which are clear of reflected light, including the divergent light from the front of an extended light source such as the arc of an E1 mercury lamp shown with light center at $F_1$. The limitation of reflected light forward of this demarcation line is a feature of the reflector, as will be seen. It makes possible prisms on the house side of the refractor efficiently constructed to redirect light from the single light source toward the near side areas of the roadway pattern, near the curbline. Areas G may also be provided with external prisms as shown. The combined prismatic action on light in areas G is lateral toward the roadway as well as upward toward the outer extremities of the road pattern. Even without the aid of the external prisms at areas G, the internal prisms, because of their slope, accomplish a certain amount of lateral redirection in addition to the lift which they provide.

FIGS. 17 and 18 show additional explanation of the prismatic redirection of light from the source $F_1$ provided by the refractor. FIG. 17 is a top view looking downward into the refractor at horizontal section 32—32 as located on the side elevational view of FIG. 18. Referring to FIG. 17 and starting at the left, note the designation of depressing prism action toward the street side of the refractor where section 32—32 intercepts the depressing visor-shaped prismatic area. Proceeding in FIG. 17 from left to right, note that the prismatic vertical lifting action is limited to 7° at 45° lateral and 12° vertical at 60° lateral. At the light source beam lateral angles such as 73° and 95° the desired lifting action is in the order of 15°. It will be noted that toward the house side of the refractor at typical positions 33 and 35 the examples of lateral redirection are shown with and without external prisms.

In FIGURE 18, it may be seen that the visor-shaped area of light depressing prisms occupies an area on the street side of the refractor bounded by two planes. The one plane defines the upper boundary of the refractor, while the other is an inclined plane defining the lower limit of the visor-shaped area. The latter inclined plane is perpendicular to the vertical median plane of the luminaire and, when extended, intersects the light source at its center $F_1$. As a result of this configuration, the projection of the lower limit of the visor-shaped area on the roadway plan is substantially a straight line extending longitudinally of the roadway and on the opposite side thereof. Because the visor-shaped prism area is formed of light depressing prisms, the light passing therethrough is redirected almost completely within the roadway pattern. The two rays indicated as impinging on the visor-shaped area at 59° vertical angle and at 67° vertical angle are shown redirected downward at about the same 50° angle by the depressing prisms.

In order to accomplish the redirection of these two rays at about the same angle, it is desirable to vary the depressing action of the prisms in the visor-shaped zone by increasing the slope of the prism face with elevation in the zone. Above a certain line, however, further increases in the slope of the prism face would prevent or at least impede removal of the refractor from its mold. Hence, the higher angle ray incident from the light source at 77° is redirected downward by approximately 7° to a comparatively high vertical angle of 70°. Very little light is wasted beyond the opposite side of the roadway, however, since the light flux passing through the uppermost regions of the visor-shaped area is such a small amount of the total light flux through this area. This is a direct consequence of the characteristic candle power distribution from elongated light sources, such as mercury arcs. The light flux within a given incremental solid angle at the higher angle, such as 77° vertical, is significantly less than the light flux in an equivalent solid angle at 59° or even 67° vertical. The comparatively small angle of light directed at high angles beyond the roadway pattern does not significantly affect the rectangular pattern of light cast by the luminaire on the opposite side of the roadway.

It will be seen in FIG. 18 that the inclined plane defining the bottom boundary of the visor-shaped area of light depressing prisms is inclined at an angle of 58° from the vertical and that the prisms are formed along planes parallel to the said inclined plane.

Several sections of the reflector of my luminaire have been shown in FIGS. 8 to 12 inclusive which, in addition to the disclosures in FIGS. 1 and 2, present the configuration thereof. It has like portions on opposite sides of the vertical median plane, and an optical center which is positioned eccentrically to the rear in this vertical median plane and above the rim portion thereof and the light reflected from its side portions through its mouth. Each side portion of the reflector is indented along longitudinally spaced apart parallel lines generally perpendicular to the roadway to provide a plurality of adjacent areas each of which has a vertical contour which along a section through the reflector is generally parabolic for a substantial distance in from the rim of the reflector with foci at its optical center and axes downwardly sloping at angles of about 60° to the vertical as shown in FIG. 10. Each of these areas is elliptical in horizontal contour with a sharp change in the direction of light reflected from adjacent areas at each of the indentations. The elliptical surfaces of these areas on each side of the reflector have, as shown in FIGS. 9 and 12, a common focus at the effective center of the light source and conjugate foci spaced lengthwise of the reflector to provide distributed beams of reflected light which overlap one another and define a main reflected light beam from each side surface of the reflector directed along and across the roadway pattern at lateral angles principally between 45° and 80°. The top portion of the reflector directs light from its optical center downward and forward and is generally of elliptical contour in vertical and horizontal sections with a principal focus at the effective center of the light source and conjugate foci spaced from and about the light source. The end portions of the reflector are elliptical in horizontal sectional contour and in vertical sectional contour as well. The vertical sectional contour changes to a parabolic form, however, at the sides of the end portions. The rear end portion of the reflector directs light downward and forward through the mouth of the reflector and the front end portion thereof directs light downward and to the rear through the mouth of the reflector. In some arrangements the elliptical sections referred to may be so flat as to approximate parabolic sections and such parabolic sections may be substituted without departing from my invention.

Figure 8:
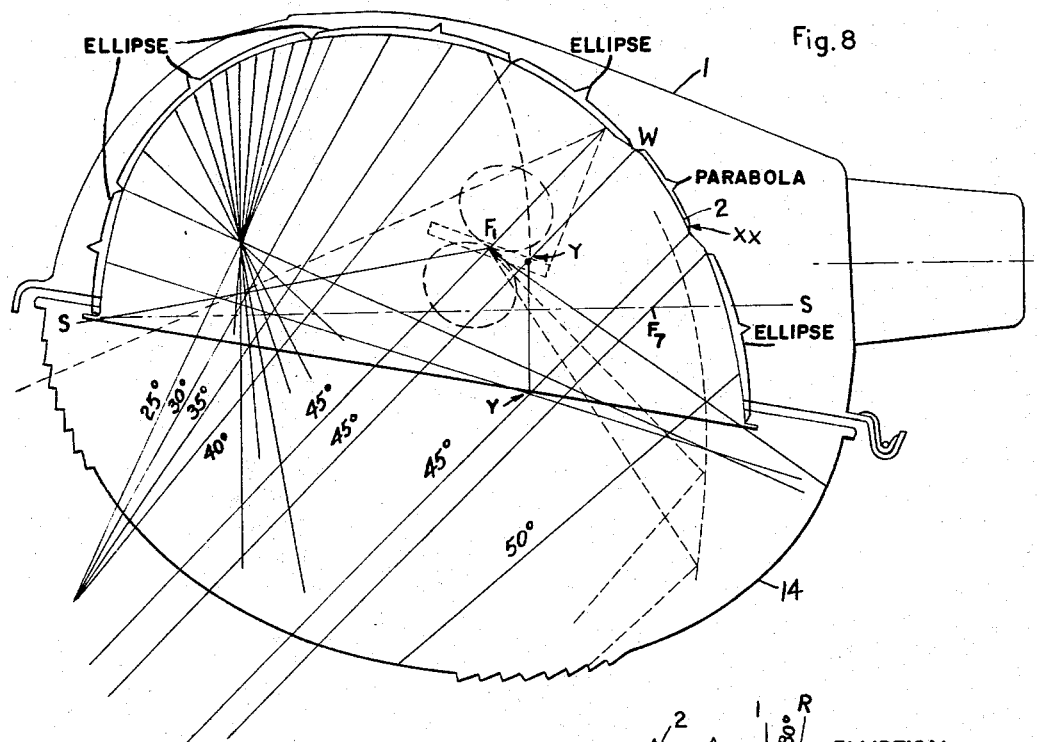

FIG. 8 shows a Type III reflector contour in section X—X transverse the roadway as shown in FIG. 9. Proportioning of light control is as indicated with large ellipsoid and paraboloid sections toward the rear of the reflector for build up of reflected light at vertical angles such as 50°, 45° and 40°. These portions merge into smaller ellipsoid sections at angles closer to the vertical such as 25° and 30°. These angles have been identified on the drawing.

It will be noted that sections of the reflector which direct light at the higher more important 40–45° angles receive a larger percentage of the principal light distribution from the tilted lamp arc than would be the case if the arc were horizontal with the maximum candle power from the arc directed toward the 35° section. Also it should be readily apparent that there is a minimum of light lost due to the opening in the reflector for the lamp base, socket, and access to wiring terminals.

Forward toward the front of the reflector, it will be noted that the ellipsoid sections are still smaller to minimize the reflected light directed downward and at small angles with respect to the vertical toward the house side of the luminaire. The relatively small amount of light from the tilted lamp arc toward this portion of the reflector also contributes to this proper proportioning of the light from the reflector. The front lower portion of the reflector is contoured to direct the light toward the house side at highest practical angles with due consideration for contour which may be readily formed. The directional control is favorable to the optional use of a deflector on the house side of the luminaire as indicated in dotted lines in FIGS. 8, 9 and 12 which could redirect light to the street side at suitable angles. The light concentration from the front of the reflector may also be utilized with special prisms for shielding or for desired lateral or vertical redirection upward, downward or outward.

The refractor 14 shown in FIG. 8 is in long axis section. The usefulness of the depressing prisms in conserving the divergent reflected light from an E1 arc to the roadway is readily apparent from the dotted ray shown as emanating from the rear of the arc.

The upper portion of FIG. 9 shows the reflector contour for light control to produce Type III lateral width of light distribution. The reflector contour is in horizontal section S—S located as shown in FIG. 8 below the lamp light center $F_1$. The lower portion of FIG. 9 shows an outline of the refractor on the lower opposite side of the long axis of the luminaire.

Features of the reflector contouring are as indicated on the diagram. The lateral contour is generally ellipsoidal. Typical thereof is that elliptical surface designated by its focal points $F_1$, $F_2$ in the drawing. Light from source $F_1$ is directed through a lateral angle extending from 80° to 45° lateral. This centers the reflected light at a lateral angle of approximately 62½°. The very slight inclination of the prisms in the front portion of areas A of the refractor results in an unsubstantial redirection of the reflected light beam laterally to approximately 65° and lifts it by about 15°. Vertically the light is concentrated by the paraboloidal vertical contour of the lower portion of the reflector as shown in FIG. 10.

FIG. 10 shows a vertical section through the reflector, light center, and refractor in a vertical plane at 80° lateral as indicated at R—R in FIGS. 9 and 12. The sectionalizing of the refractor into light source beam areas D and E and reflected light beam areas A is readily apparent. Also note the paraboloidal vertical section Y—Y (also shown in FIG. 8) of the lower portion of the reflector providing the vertical concentration of reflected light into the reflected light beam areas A of the refractor in avoidance of the light source beam areas such as D and E. Above the top of this paraboloidal section, Y—Y a merging area connects this portion of the reflector with the inclined plane light section at Y–W shown in FIGS. 8 and 11. The reflector and lamp bulb section in FIG. 11 is shown in projection which is normal to the plane which is inclined at 45° along the line Y–W as shown in FIG. 8. This section of the Type III reflector redirects the light from the source $F_1$ toward the center of the roadway largely along the 1 MH longitudinal roadway line shown on the road plan of FIG. 14 for the distance as designated from T to point Q. Point Q corresponds to the light ray from the lower portion of the inclined plane YW. This light in various sections of the upper portion of the reflector is properly merged with that from the reflected light beam area Y—Y of the reflector shown in FIG. 10.

The lateral spread of 45° to 80° light from this reflected light beam area is shown on the road plan of FIG. 14. The principal lateral concentration, FIG. 14, is at lateral angles of 60° to 65° in order that this light, after prismatic action on the part of the refractor, provide a well formed beam with maximum candle power at 65° lateral as shown in FIG. 16.

Referring to FIG. 11, it should be noted that the ellipsoidal lower portion of this reflector identifiable by its focal points $F_1$-$F_{20}$ has a longer focus of light flux than the adjacent ellipsoid $F_1$-$F_{21}$. Hence a larger solid angle of light flux from the source $F_1$ is directed along and across the roadway area Q–T as seen in FIG. 14. The increase of light with distance from points along the transverse such as T along longitudinal lines to points such as Q is an important feature of the reflector resulting in a larger proportion of the available light falling within the roadway pattern. It is also important that this build up be gradual and free from peaks which will cause pavement brightness streaks and striations.

A further feature of the light control shown in FIG. 11 is the avoidance of reflected light interception by the arc tube such as that in an E1 lamp with light center at $F_1$. This is an important feature in obtaining maximum light output efficiency. As shown in FIG. 8 other inclined plane light reflection sections in the upper area of the reflector are merged with other lateral light source beam areas. The nearly vertical sections in the latter beam areas of the reflector could be ellipsoidal, flat, or hyperboloidal. The lateral sections could be paraboloidal, flat or hyperboloidal.

The forward inclination of lamp axis and features of reflector and refractor control of light distribution reduce the adverse effects of disability or veiling glare. This glare is most severe at near-side-of-roadway locations, where the angles at the driver's eyes are relatively small between the driver's line of sight along his roadway path and the luminaire glare sources. Points M on FIGS. 13 and 14 indicate the lower angle shielding or depressing of the near curb light to vertical angles such as 70° without lowering the 75° vertical angle of maximum candle power shown at points N.

FIGS. 15 and 16 show illustrative examples of Type II and Type III lateral light distribution in the cone of maximum candle power that may be obtained by control and proportioning of the reflected light. In FIG. 15 the combined lateral light distribution lobe designed A and E is the summation of candle power in the maximum cone from the reflected light beam portion of the luminaire designated A in this diagram plus that from the light source beam designated E. The proportioning is such that the lateral angle of maximum candle power from A and E is at 77° in the cone of maximum candle power which in this example is at 75° vertical as shown at the right of FIG. 15.

The lateral width of A and E light distribution in this example is shown as 25°. This corresponds to the preferred lateral width of light distribution for Type II in accordance with the A.S.A. American Standard Practice for Street and Highway Lighting adopted in 1953.

Referring to FIG. 16, it will be noted that the light source beam candle power lobe designated E is about the same as the corresponding E lobe in FIG. 15. This light from the refractor prisms acting upon impinging light direct from the source is practically unaffected by the reflected light. The reflected light beam candle power distribution lobe A in FIG. 16 with maximum at 65° lateral in the cone of maximum candle power results from the refractor prisms acting upon the light from a different reflector for Type III lateral width of light distribution.

The lateral distribution A and E representing a summation of the candle power E plus A in this example has maximum candle power at 70° lateral with a lateral width of 40° as preferred in the A.S.A. practice referred to above.

FIGURE 19 shows the light patterns produced on the roadway for Type II and Type III light distributions, substantially in accordance with the above mentioned A.S.A. Standard Practice. As is seen, the light pattern on the horizontal plane of the roadway in each case occupies a generally oval area which is elongated in the direction of the roadway.

While I have described preferred embodiments of my invention by way of illustration, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. In a luminaire adapted to be positioned at one side of a roadway, an ovate bowl-shaped reflector having its rim portion terminating in a plane inclined up and toward the roadway at an angle of about 10°, an elongated light source supported in the cavity of said reflector and tilted up and forward to the roadway at an angle of about 10° to 20°, said reflector having oppositely disposed side areas of connected ellipsoidal sections which reflect light at lateral angles of about 80° at their front portions and at lateral angles as low as 45° at their rear portions and which have their principal foci at the light center of said light source and conjugate foci spaced lengthwise of the reflector, said ellipsoidal areas being parabolic in vertical contour with foci at said light center and axes at 60° to the vertical and said reflector also having large ellipsoidal and parabolic sections at the rear of its top area for reflecting light at angles decreasing forwardly from 50° to 40° and smaller ellipsoidal areas at the front of its top area for reflecting light at angles decreasing from 30° to 25°.

2. In a luminaire adapted to be positioned at one side of a roadway, an ovate bowl-shaped refractor having its mouth facing upwardly and lying in a plane inclined upwardly toward the roadway at an angle of approximately 10° from the horizontal, said refractor being symmetrical about a vertical median plane transverse to said roadway and having a light center above said mouth and in said median plane and eccentrically to the house side of the refractor, said refractor having a visor-shaped area of light-depressing prisms on the street side thereof, said visor-shaped area extending from the top street-side edge of said refractor downward to a line defined by the interception by said refractor of an inclined plane passing through said light center toward said roadway at an angle of approximately 58° from the vertical and perpendicular to said median plane, said light-depressing prisms being formed along planes parallel to said inclined plane.

3. In a luminaire as set forth in claim 2, said refractor having a band area of wrap-around external prisms a slight distance behind said light center and arranged to deflect light incident thereto from said light center to the roadway along and adjacent the curb line.

4. In a luminaire adapted to be positioned at one side of a roadway, an ovate bowl-shaped refractor having its mouth facing upwardly and lying in a plane inclined upwardly toward the roadway at an angle of approximately 10° from the horizontal, said refractor being symmetrical about a vertical median plane transverse to said roadway and having a light center above said mouth and in said median plane and eccentrically to the house side of the refractor, said refractor having a visor-shaped area of light-depressing prisms on the street side thereof, said visor-shaped area extending from the top street-side edge of said refractor downward to a line defined by the interception by said refractor of an inclined plane passing through said light center toward said roadway at an angle of approximately 58° from the vertical and perpendicular to said median plane, said light-depressing prisms being formed along planes parallel to said inclined plane, and an elongated light source mounted in said median plane with its longitudinal axis inclined upwardly toward the roadway at an angle of about 10–20° and its effective center at said light center of said refractor.

5. A luminaire adapted to be positioned at one side of a roadway and symmetrical on opposite sides of a vertical median plane transverse to said roadway comprising, a downwardly opening ovate concave reflector having a light center within its cavity in said median plane and eccentrically to the house side of said luminaire, the rim portion of said reflector terminating in a plane inclined upwardly toward said roadway at an acute angle of approximately 10°, the sides of said reflector for a substantial distance upwardly from the rim thereof being of parabolic contour in vertical sections with foci at said light center and axes downwardly sloping to provide a vertical concentration of the light reflected therefrom into main beams which are directed downward through the mouth of the reflector at lateral angles predominantly along and across the roadway, an elongated light source mounted in said reflector in said median plane with its longitudinal axis tilted upward toward said roadway at an acute angle of about 10–20° and its center at said light center of the reflector.

6. A luminaire adapted to be positioned at one side of a roadway and symmetrical on opposite sides of a vertical median plane transverse to said roadway comprising, a downwardly opening ovate concave reflector having a light center within its cavity in said median plane and eccentrically to the house side of said luminaire, the rim portion of said reflector terminating in a plane inclined upwardly toward said roadway at an acute angle of approximately 10°, the sides of said reflector for a substantial distance upwardly from the rim thereof being of parabolic contour in vertical sections with foci at said light center and axes downwardly sloping to provide a vertical concentration of the light reflected therefrom into main beams which are directed downward through the mouth of the reflector at lateral angles predominantly along and across the roadway, an elongated light source mounted in said reflector in said median plane with its longitudinal axis tilted upward toward said roadway at an acute angle of about 10–20° and its center at said light center of the reflector, and an ovate bowl-shaped refractor having its mouth facing the mouth of said reflector, said refractor having a visor-shaped area of light-depressing prisms on the street side thereof, said visor-shaped area extending from the top street-side edge of said refractor downward to a line defined by the interception by said refractor of an inclined plane passing through said light center toward said roadway at an angle of approximately 58° from the vertical and perpendicular to said median plane, said light-depressing prisms being formed along planes parallel to said inclined plane.

7. A luminaire adapted to be positioned at one side of a roadway and symmetrical on opposite sides of a vertical median plane transverse to said roadway comprising, a downwardly opening ovate concave reflector having a light center within its cavity in said median plane and eccentrically to the house side of said luminaire, the rim portion of said reflector terminating in a plane inclined upwardly toward said roadway at an acute angle of approximately 10°, the sides of said reflector for a substantial distance upwardly from the rim thereof being of parabolic contour in vertical sections with foci at said light center and axes downwarrly sloping to provide a vertical concentration of the light reflected therefrom into main beams which are directed downward through the mouth of the reflector at lateral angles predominantly along and across the roadway, the said sides of the reflector being contoured horizontally to direct said main beams at lateral angles between limiting angles of about 80° at one side of the beam and down to 45° at the other side of the beam, an elongated light source mounted in said reflector in said median plane with its longitudinal axis tilted upward toward said roadway at an acute angle of about 10–20° and its center at said light center of the reflector, and an ovate bowl-shaped refractor having its mouth facing the mouth of said reflector, said refractor having prismatic areas defining reflected light beam sections on lower opposite sides thereof and light source beam sections above and adjacent said reflected light beam sections, said reflected light beam sections of the refractor lifting the reflected light of said main beams incident thereon without substantial lateral redirection and said light source beam sections of the reflector lifting and laterally redirecting toward the near side of the roadway the light from said source incident thereon to provide beams supplementing said main beams of reflected light.

8. A luminaire adapted to be positioned at one side of a roadway and symmetrical on opposite sides of a vertical median plane transverse to said roadway comprising, a downwardly opening ovate concave reflector having a light center within its cavity in said median plane and eccentrically to the house side of said luminaire, the rim portion of said reflector terminating in a plane inclined upwardly toward said roadway at an acute angle of approximately 10°, the sides of said reflector for a substantial distance upwardly from the rim thereof being of parabolic contour in vertical sections with foci at said light center and axes downwardly sloping at about 60° from the vertical to provide a vertical concentration of the light reflected therefrom into main beams which are directed downward through the mouth of the reflector at lateral angles predominantly along and across the roadway, the said sides of the reflector being contoured horizontally to direct said main beams at lateral angles between limiting angles of about 80° at one side of the beam and down to 45° at the other side of the beam, an elongated light source mounted in said reflector in said median plane with its longitudinal axis tilted upward toward said roadway at an acute angle of about 10–20° and its center at said light center of the reflector, and an ovate bowl-shaped refractor having its mouth facing the mouth of said reflector, said refractor having prismatic areas defining reflected light beam sections on lower opposite sides thereof and light source beam sections above and adjacent said reflected light beam sections, said reflected light beam sections of the refractor lifting by about 15° the reflected light of said main beams incident thereon without substantial lateral redirection, and said light source beam sections of the reflector lifting and laterally redirecting toward the near side of the roadway at about 78° lateral the light from said source incident thereon to provide beams supplementing said main beams of reflected light.

9. A luminaire adapted to be positioned at one side of a roadway and symmetrical on opposite sides of a vertical median plane transverse to said roadway comprising, a downwardly opening ovate concave reflector having a light center within its cavity in said median plane and eccentrically to the house side of said luminaire, the rim portion of said reflector terminating in a plane inclined upwardly toward said roadway at an acute angle of approximately 10°, the sides of said reflector for a substantial distance upwardly from the rim thereof being of parabolic contour in vertical sections with foci at said light center and axes downwardly sloping to provide a vertical concentration of the light reflected therefrom into main beams which are directed downward through the mouth of the reflector at lateral angles predominantly along and across the roadway, the said sides of the reflector being contoured horizontally to direct said main beams at lateral angles between limiting angles of about 80° at one side of the beam and down to 45° at the other side of the beam, an elongated light source mounted in said reflector in said median plane with its longitudinal axis tilted upward toward said roadway at an acute angle of about 10–20° and its center at said light center of the reflector, and an ovate bowl-shaped refractor having its mouth facing the mouth of said reflector, said refractor having prismatic areas defining reflected light beam sections on lower opposite sides thereof and light source beam sections above and adjacent said reflected light beam sections, said reflected light beam sections of the refractor lifting the reflected light of said main beams incident thereon without substantial lateral redirection, and said light source beam sections of the refractor lifting and laterally redirecting toward the near side of the roadway the light from said source incident thereon to provide beams supplementing said main beams of reflected light, and additional areas of prisms adjacent the front boundary of said reflected light beam sections and containing light lifting prisms having lift angles decreasing forwardly of the area from the angle of the prisms in said reflected light beam sections to zero.

10. In a luminaire adapted to be positioned at one side of a roadway and symmetrical on opposite sides of a vertical median plane, a downwardly opening ovate bowl-shaped reflector having its rim portion terminating in a plane inclined upwardly toward said roadway at an angle of about 10°, an elongated light source supported in the cavity of said reflector in said median plane and tilted up and forward to the roadway at an angle of about 10–20°, said reflector having oppositely disposed side areas of connected ellipsoidal sections which reflect light at lateral angles of about 80° at their front portions and at lateral angles as low as 45° at their rear portions and which have their principal foci at the light center of said light source and conjugate foci spaced lengthwise of the reflector, said ellipsoidal areas being parabolic in vertical contour with foci at said light center and axes at about 60° to the vertical, and said reflector also having large ellipsoidal and parabolic sections at the rear of its top area for reflecting light at vertical angles decreasing forwardly from about 50° to 40° and smaller ellipsoidal areas at the front of its top area for reflecting light at vertical angles decreasing from about 30° to 25°, and an ovate bowl-shaped refractor having its mouth facing the mouth of said reflector, said refractor having on each side thereof predominately street-side areas of reflected light prisms which intercept reflected light from the sides of said reflector and vertically redirect it upward by about 15°, and areas of prisms immediately above said areas of reflected light prisms which vertically lift and laterally redirect toward the near side of the roadway light incident thereto directly from said light source to supplement the reflected light passing through said areas of reflected light prisms.

11. A luminaire adapted to be positioned at one side of a roadway comprising an ovate bowl-shaped reflector symmetrical on opposite sides of a median plane perpendicular to said roadway and having an optical center located eccentrically to the rear in said median plane and above the rim portion of said reflector, the said rim portion of the reflector terminating in a plane which is inclined at an acute angle of about 10° upwardly toward said roadway resulting in a vertical angle of cut-off which is greater on the street side of said reflector than on the house side thereof, an elongated light source mounted within said reflector in said median plane with its effective center at the optical center of said reflector and with its longitudinal axis tilted upward at an acute angle of about 10–20° toward said roadway, each side portion of said reflector being indented along longitudinally spaced apart parallel lines generally perpendicular to the roadway to provide a plurality of adjacent areas each of which has a vertical contour which along sections through the reflected light is generally parabolic for a substantial distance upwardly from the rim of the reflector with foci at said optical center and axes sloping downwardly toward said median plane at angles of about 60° to the vertical and each of which is elliptical in horizontal contour with a sharp change in the direction of light reflected from adjacent areas at each of said indentations and with all the elliptical surfaces of said areas of one side of said reflector having a common focus at the optical center and conjugate foci spaced lengthwise of the reflector to provide distributed beams of light which overlap one another and define a main light beam reflected from each side surface of said reflector, and an ovate bowl-shaped refractor closing the mouth of said reflector, said refractor having a visor-shaped area of light-depressing prisms at the front end thereof and extending from the top edge of said refractor downward to a line defined by the interception of said refractor by an inclined plane passing through said optical center and perpendicular to said median plane and inclined toward the roadway at an angle of about 58° to the vertical, said prisms being formed along planes parallel to said inclined plane, said refractor having further prismatic areas defining reflected light beam sections on lower opposite sides thereof and arranged principally to lift said main light beams reflected from each side surface of said reflector to elongate the beam pattern on the roadway, said refractor having further prismatic areas defining light source beam sections above and adjacent said reflected light beam sections and arranged to lift and laterally redirect toward the near side of the roadway the light incident thereon to supplement said main light beams.

12. A luminaire comprising a light source, a light interceptor with an oval shaped mouth centered substantially under the light source which limits the escape of direct light at variable vertical angles above the nadir and in a cone with an oval section, and emits such light onto an elongated oval area on a horizontal plane below the light interceptor, an externally convex oval shaped refracting bowl below the interceptor and through which the direct light passes, the bowl having on its outer surface and toward one end thereof a system of refracting prisms which lower the direct light falling thereon and cause it to fall onto said area nearer the center thereof, said bowl having toward its other end a system of external parallel prisms located in vertical planes parallel to the length of the oval area and extending round the bottom and sides of the bowl for redirecting light downwardly and laterally.

13. A street lighting luminaire comprising a light source, an oval refractor having a house side portion which intercepts light which would otherwise fall beyond a curbline, said house side portion having vertical, external light redirecting prisms occupying a band toward the house side of the vertical plane through the source and extending round the bottom and sides of the refractor in planes substantially parallel to the direction of the street and of a refracting power to lower such light substantially to the vertical plane and to bend the light laterally toward the curb so that it may fall inside the curb, the inner surface of said refractor having sets of prisms including light elevating prisms opposite the upper portions of the external prisms for producing a light distribution elongated in the direction of the street.

References Cited by the Examiner

UNITED STATES PATENTS

| | | | |
|---|---|---|---|
| 1,915,967 | 6/1933 | Bailey | 240—52 |
| 2,017,075 | 10/1935 | Rolph et al. | 240—93 X |
| 2,152,834 | 4/1939 | Arbuckle | 240—41.5 |
| 2,166,394 | 7/1939 | Crossley | 240—52 |
| 2,218,326 | 10/1940 | Anklam | 240—41.5 |
| 2,229,034 | 1/1941 | Bergmans et al. | 240—25 |
| 2,280,160 | 4/1942 | Rolph et al. | 240—106 |
| 2,284,356 | 5/1942 | Arenberg. | |
| 2,289,160 | 7/1942 | Yost | 240—25 |
| 2,474,326 | 6/1949 | Rolph | 240—25 |
| 2,566,126 | 8/1951 | Franck | 240—25 |
| 2,578,451 | 12/1951 | Rex | 240—25 |
| 2,584,671 | 2/1952 | Cator et al. | 240—11.4 |
| 2,600,514 | 6/1952 | Mitchell | 240—41.37 X |
| 2,608,642 | 8/1952 | Cibie | 240—41.5 |
| 2,739,226 | 3/1956 | Rex | 240—25 |
| 2,778,929 | 6/1957 | Loehr | 240—25 |

FOREIGN PATENTS 667,085   2/1952   Great Britain.

NORTON ANSHER, *Primary Examiner.*

ARTHUR SHAPIRO, DELBERT B. LOWE, GEORGE NINAS, JR., *Examiners.*

E. E. FULLER, *Assistant Examiner.*

UNITED STATES PATENT OFFICE
CERTIFICATE OF CORRECTION

Patent No. 3,283,140                      November 1, 1966

Charles H. Rex

It is hereby certified that error appears in the above numbered patent requiring correction and that the said Letters Patent should read as corrected below.

Column 1, line 52, for "comprised" read -- compromised --; column 2, line 30, for "lamp" read -- lamps --; line 55, for "angularly" read -- angularity --; column 3, line 60, strike out "of"; column 12, line 66, for "downwarrly" read -- downwardly --; column 13, lines 11 and 48, for "reflector", each occurrence read -- refractor --.

Signed and sealed this 5th day of September 1967.

(SEAL)
Attest:

ERNEST W. SWIDER                    EDWARD J. BRENNER
Attesting Officer                 Commissioner of Patents

Dedication 3,283,140.—*Charles H. Rex*, Marblehead, Mass. STREET LUMINAIRE. Patent dated Nov. 1, 1966. Dedication filed July 29, 1974, by the assignee, *Johns-Manville Sales Corporation*.

Hereby dedicates to the Public claims 1–13 of said patent.

[*Official Gazette November 26, 1974.*]